(12) United States Patent
Agassounon et al.

(10) Patent No.: US 12,717,351 B2
(45) Date of Patent: Aug. 25, 2026

(54) AIR-BASED LASER COUNTER-COUNTERMEASURE SYSTEM

(71) Applicant: Textron Systems Corporation, Hunt Valley, MD (US)

(72) Inventors: William Bignon Agassounon, Lexington, MA (US); Anton Zavriyev, Swampscott, MA (US); Robert Lloyd Steadman, Mansfield, MA (US); Abel Oak Livingstone, Hampstead, NH (US); Henry Joseph Finneral, Tewksbury, MA (US)

(73) Assignee: TEXTRON SYSTEMS CORPORATION, Hunt Valley, MD (US)

( * ) Notice: Subject to any disclaimer, the term of this patent is extended or adjusted under 35 U.S.C. 154(b) by 72 days.

(21) Appl. No.: 18/887,432

(22) Filed: Sep. 17, 2024

(65) Prior Publication Data

US 2026/0016839 A1 Jan. 15, 2026

Related U.S. Application Data

(60) Provisional application No. 63/671,434, filed on Jul. 15, 2024.

(51) Int. Cl.
*F41H 13/00* (2006.01)
*B64U 10/10* (2023.01)
(Continued)

(52) U.S. Cl.
CPC ............ *G05D 1/689* (2024.01); *B64U 10/10* (2023.01); *F41H 13/005* (2013.01); (Continued)

(58) Field of Classification Search
None
See application file for complete search history.

(56) References Cited

U.S. PATENT DOCUMENTS

| | | | |
|---|---|---|---|
| 7,916,065 B1 | 3/2011 | Mintz et al. | |
| 8,258,994 B2 | 9/2012 | Hamilton | |

(Continued)

FOREIGN PATENT DOCUMENTS

| | | | |
|---|---|---|---|
| EP | 2840414 B1 | 6/2020 | |
| WO | WO2023/234873 | * 12/2023 | ............ G01S 7/495 |

*Primary Examiner* — James M McPherson
(74) *Attorney, Agent, or Firm* — BainwoodHuang

(57) ABSTRACT

An air-based counter-countermeasure (CCM) system includes an autonomous or semi-autonomous unmanned aircraft capable of deployment to an area of a countermeasure system having (1) a laser detector to receive and identify an incident laser signal as a target designator signal and (2) one or more countermeasure subsystems operative in response to an output of the laser detector to deploy corresponding countermeasures against a laser target designator. The CCM system further includes a laser-based CCM subsystem carried by the aircraft, the CCM subsystem being configured and operative, during the deployment of the aircraft, to direct a simulated target designator laser signal to the laser detector of the countermeasure system to trigger one or more of the countermeasures and thereby reduce protective ability of the countermeasure system against subsequent laser-guided attack.

20 Claims, 3 Drawing Sheets

(51) Int. Cl.

| | |
|---|---|
| ***G05D 1/689*** | (2024.01) |
| *B64U 101/17* | (2023.01) |
| *G05D 105/35* | (2024.01) |
| *G05D 109/25* | (2024.01) |

(52) U.S. Cl.
CPC ..... *B64U 2101/17* (2023.01); *G05D 2105/35* (2024.01); *G05D 2109/25* (2024.01)

(56) References Cited

U.S. PATENT DOCUMENTS

| | | | | |
|---|---|---|---|---|
| 9,074,852 | B2 | 7/2015 | Adler et al. | |
| 9,829,281 | B2 | 11/2017 | Radl et al. | |
| 9,835,420 | B2 | 12/2017 | Fontanella et al. | |
| 10,044,465 | B1 | 8/2018 | Hetsko et al. | |
| 10,291,878 | B2 | 5/2019 | Keegan et al. | |
| 10,549,850 | B1 * | 2/2020 | Ryan | B64U 20/50 |
| 11,359,892 | B2 | 6/2022 | Hening et al. | |
| 11,434,003 | B2 | 9/2022 | Madhav et al. | |
| 11,700,079 | B2 | 7/2023 | Rudow et al. | |
| 11,713,946 | B2 | 8/2023 | Sipes, Jr. | |
| 11,747,480 | B2 | 9/2023 | Goldstein et al. | |
| 11,753,160 | B2 * | 9/2023 | Reddy | F42B 10/14<br>701/2 |
| 2012/0059829 | A1 * | 3/2012 | Barr | G06F 18/241<br>707/E17.084 |
| 2020/0284557 | A1 | 9/2020 | Madhav et al. | |
| 2021/0383506 | A1 * | 12/2021 | Braunreiter | F41G 3/145 |
| 2023/0076107 | A1 | 3/2023 | Rudow et al. | |
| 2025/0341385 | A1 * | 11/2025 | Knezevic | F41G 7/007 |

* cited by examiner

AIR-BASED LASER COUNTER-COUNTERMEASURE SYSTEM

BACKGROUND

The invention is related to the field of laser-guided munitions and associated countermeasure systems.

SUMMARY

An air-based counter-countermeasure (CCM) system is disclosed that includes an autonomous or semi-autonomous unmanned aircraft capable of deployment to an area of a countermeasure system having (1) a laser detector to receive and identify an incident laser signal as a target designator signal and (2) one or more countermeasure subsystems operative in response to an output of the laser detector to deploy corresponding countermeasures against a laser target designator. The CCM system further includes a laser-based CCM subsystem carried by the aircraft, the CCM subsystem being configured and operative, during the deployment of the aircraft, to direct a simulated target designator laser signal to the laser detector of the countermeasure system to trigger one or more of the countermeasures and thereby reduce protective ability of the countermeasure system against subsequent laser-guided attack.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Modern adversarial land, sea, and air systems are equipped with defensive laser receivers that act, for instance, as laser warning and/or countermeasure systems against incoming laser-guided munitions. Typically, this system detects that it is being painted by a laser designator and may: 1) automatically eject obscurants (e.g., smoke) to conceal itself, 2) deploy a weapon to suppress or destroy the laser designator, or 3) or direct a dazzler at the incoming missile to "blind" it (render its guidance system ineffective).

A disclosed innovation combines an electro-optical (EO), infrared (IR), or multispectral camera for automatic target recognition (ATR) and a pulsed laser system integrated onto an autonomous or semi-autonomous unmanned aerial vehicle (UAV) to defeat adversarial defensive laser countermeasure systems. The system searches and finds a prescribed target autonomously or upon command, aims its laser effector at the target's laser receiver, and transmits prescribed laser signatures to deceive and/or jam the target laser receiver. Generally, the laser signatures closely mimic the signatures of laser range finders, designators, and markers used for munitions guiding, i.e., the types of signatures that the laser countermeasure system is presumably designed to detect as hostile. Here "signature" refers to a unique combination of features in a laser signal, such as intensity, pulse width, laser frequency, or pulse repetition rate. In operation, the system may provoke observable events from otherwise hidden platforms, making their locations known and thus enabling a separate attack or other action with respect to such platforms.

The following are features or elements that may be present in various embodiments:

- Combination and integration of EO/IR ATR and pulse laser into a UAV
- UAV autonomously searches and finds adversarial laser receiver
- UAV maneuvers to aim the laser at the receiver aperture precisely and transmits prescribed signals at the receiver
- Multiple UAVs can collaborate to coordinate their attacks on one or multiple adversary laser receivers.
- Small form factor emitter for generating pulsed optical output, e.g., Q-switched laser, direct drive laser, gain-switched laser, mode-locked laser, etc.

The following are potential use cases for the disclosed counter-countermeasure system:

- Defeat of counter guided munitions
- Intelligence, surveillance and Reconnaissance (ISR) capability denial.
- Long range attack

EMBODIMENTS

Figure 1:
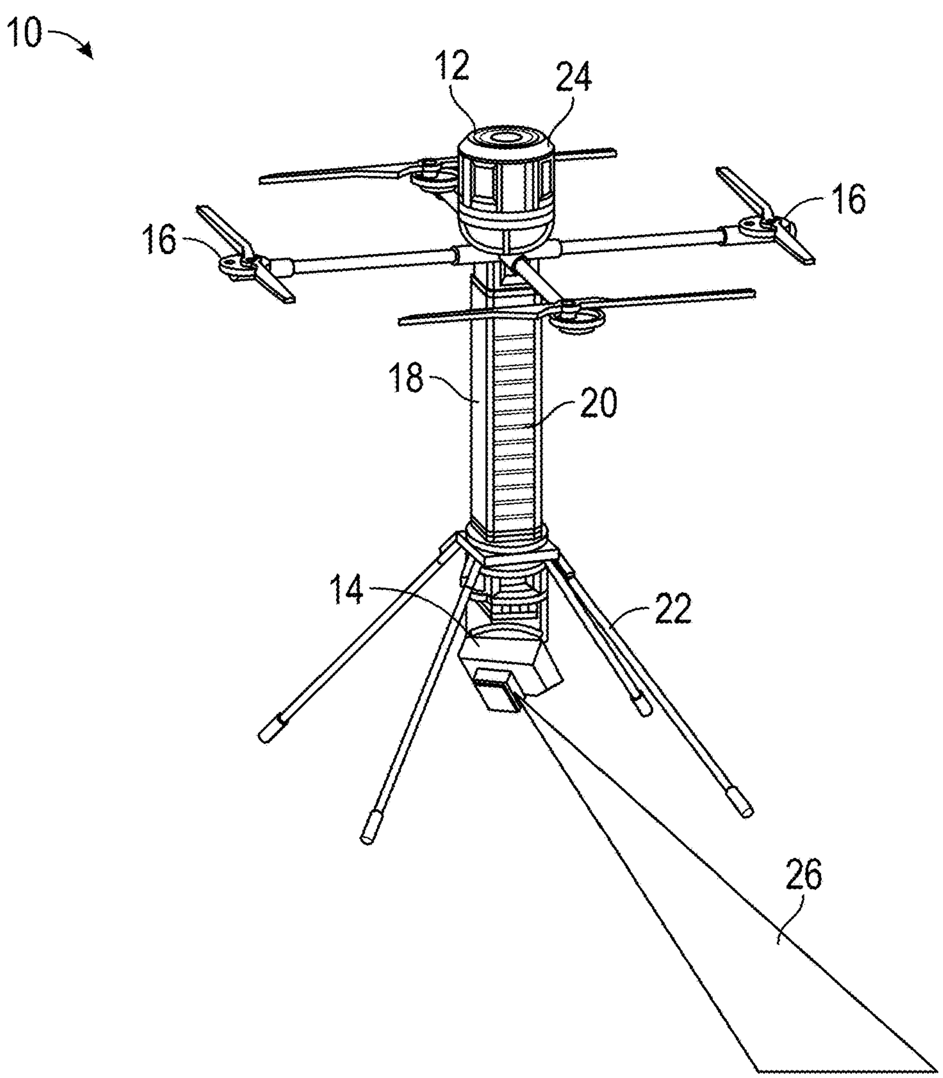
FIG. 1 is a depiction of a counter-countermeasure (CCM) system based on a small unmanned aerial system (SUAS) platform.

FIG. 1 shows an embodiment of a laser counter-countermeasure (CCM) system 10 in which a rotorcraft-style small unmanned aerial system (SUAS; also referred to as "UAV" herein) 12 carries a laser counter-countermeasure (CCM) subsystem or device 14 as a payload. The SUAS 12 has a so-called "quadcopter" configuration, with four electrical rotors 16 at the ends of respective foldable arms which are attached at an upper end of an elongated cylindrical body 18. The body 18 carries a power source 20 in the form of one or more batteries, a foldable landing gear 22, and the payload 14 at a bottom end. An upper compartment 24 houses UAS avionics which control flight and associated operations. In operation, the CCM device 14 generates a laser beam 26 directed at a target countermeasure (CM) system as described more below.

Figure 2:
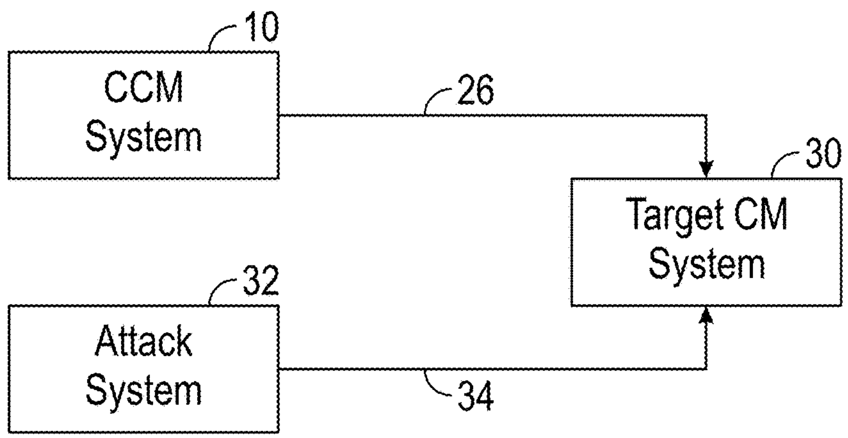
FIG. 2 is a simplified schematic diagram of a deployment scenario.

FIG. 2 is a simplified diagram of a deployment scenario against a target CM system 30. A CCM system 10 is maneuvered into a desired position and, upon detecting a laser detector of the target CM system, generates a laser beam 26 in a manner that disables or degrades operation of the target CM system 30, rending it ineffective against a laser-based attack system 32, which then uses a laser finder/designator 34 to guide a munition to target associated with the target CM system 30 (typically at the same location). Additional aspects of operation are described below.

Figure 3:
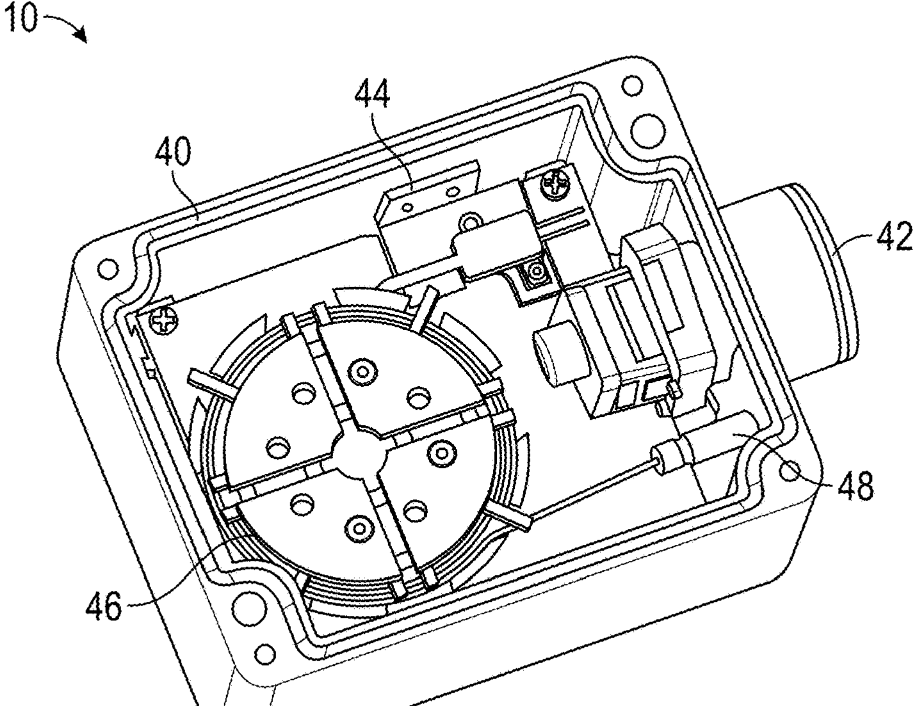
FIGS. 3 and 4 are diagrams of internals of a CCM device carried as a payload in the CCM system.
Figure 4:
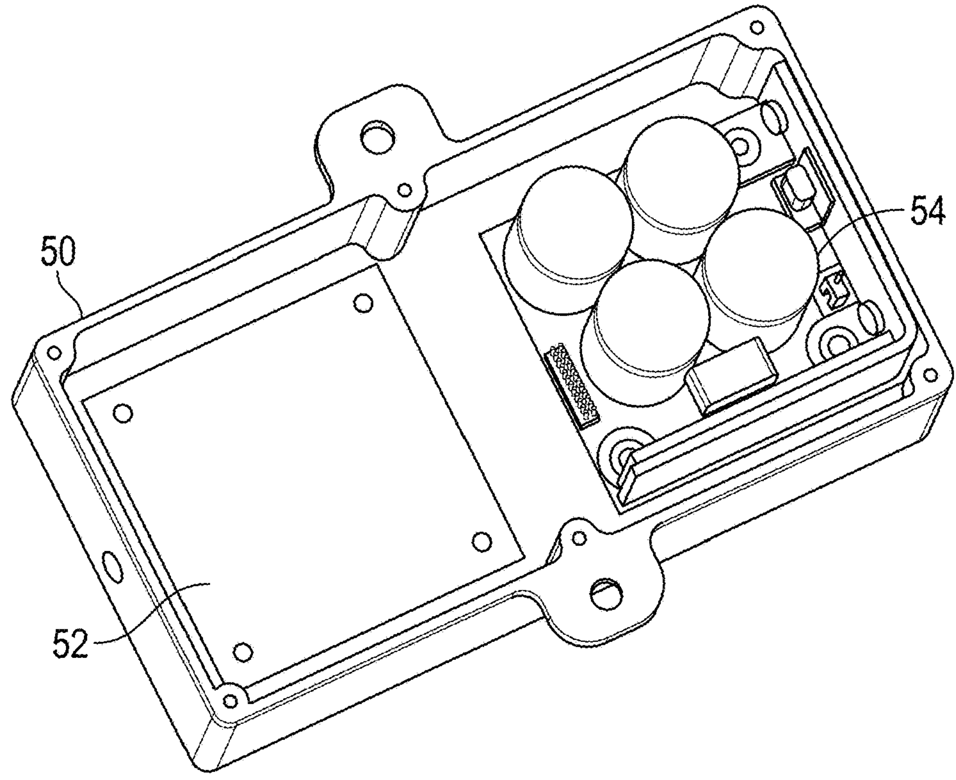

FIGS. 3 and 4 show details of the CCM device 14 in one embodiment. The device 14 has a "clamshell" arrangement in which one housing portion 40 (FIG. 3) houses various laser components and a camera 42 used for automatic target recognition (ATR). The laser components include a high-power diode laser 44, a length of optical fiber carried by a fiber spool 46, and collimator 48 which functions as an exit aperture for the laser beam 26 (FIGS. 1 and 2). In one embodiment, the ATR camera 42 is an EO/IR camera. The other housing portion 50 (FIG. 4) houses control electronics 52 and pulser electronics 54 for pulsed operation of the laser 44.

Figure 5:
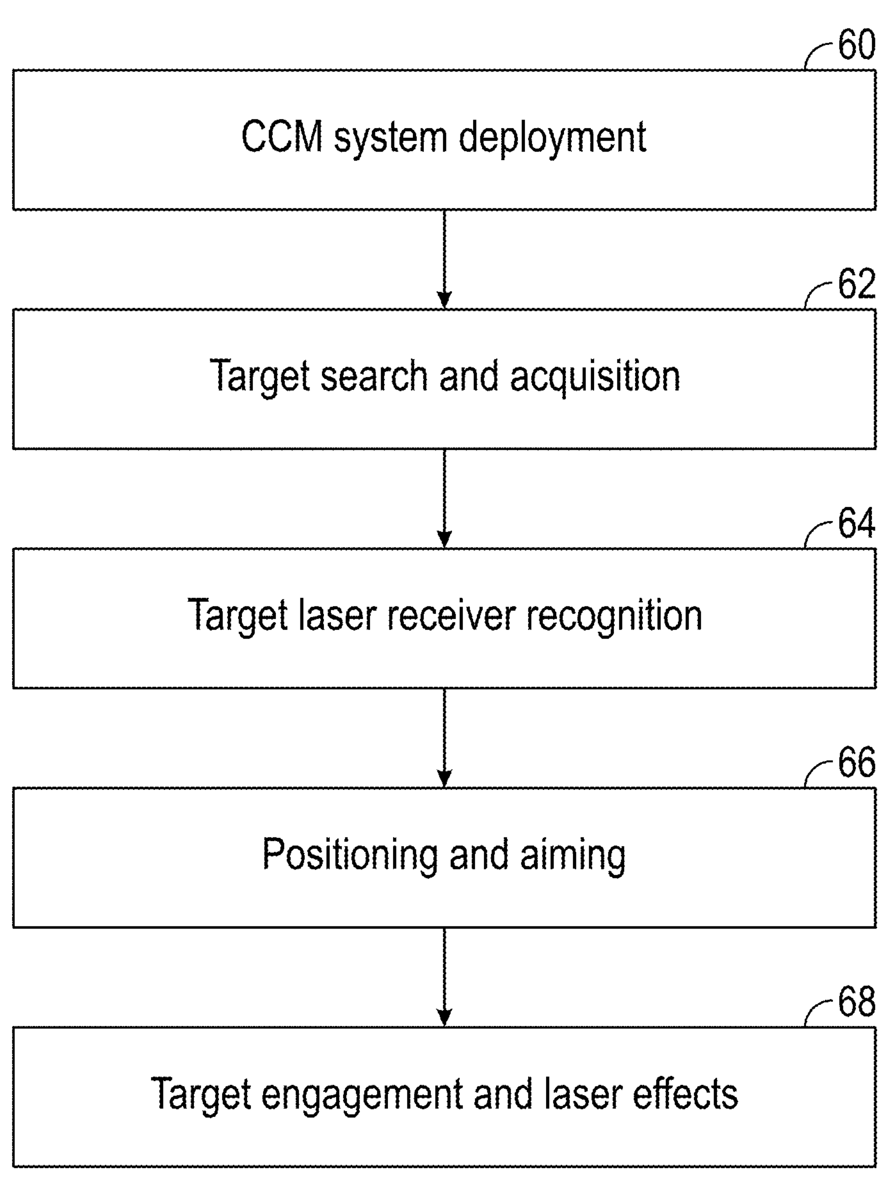
FIG. 5 is a simplified flow diagram for a process of deploying and using the CCM system.

FIG. 5 illustrates operation in a set of phases in one embodiment as follows:

60—CCM System Deployment: In this phase, the SUAS-based CCM system (e.g., CCM system 10), equipped with an integrated EO/IR or multispectral camera and a pulsed laser system, is deployed. This deployment can be manual or via other assets such as larger crewed or uncrewed vehicles, munition dispensers, or rocket and artillery systems. An onboard library of the CCM system contains prescribed target categories and specifications, e.g., types of laser receivers onboard and their emplacements on the target.

62—Target Search and Acquisition: In this phase, the CCM system utilizes its EO/IR or multispectral camera and advanced automatic target recognition (ATR) algorithms to search for and acquire the prescribed target.

64—Target Laser Receiver Recognition: In this phase, the CCM system further utilizes its ATR algorithm to locate the laser receiver and its precise emplacement on the prescribed target platform.

66—Positioning and Aiming: In this phase, the CCM system autonomously maneuvers into position and aims its laser aperture at the target laser receiver aperture.

68—Target Engagement and Laser Effects: In this phase, the CCM system transmits specific laser pulses—in terms of intensity, pulse width, frequency, and pulse repetition matching the specificities of the identified laser receiver—to simulate prescribed laser devices of the type the target system presumably is designed/trained to detect. The CCM system may repeat this operation until the target platforms countermeasure system is triggered into operation, or as long as commanded, or as long as its battery lasts. As noted above, once the target countermeasure system has been degraded or disabled, a laser-based attack system is then able to engage the target with destructive effect.

While various embodiments of the invention have been particularly shown and described, it will be understood by those skilled in the art that various changes in form and details may be made therein without departing from the scope of the invention as defined by the appended claims.

What is claimed is:

1. An air-based counter-countermeasure system, comprising:

an autonomous or semi-autonomous unmanned aircraft capable of deployment to an area of a countermeasure system having (1) a laser detector to receive and identify an incident laser signal as a target designator signal and (2) one or more countermeasure subsystems operative in response to an output of the laser detector to deploy corresponding countermeasures against a laser target designator; and a laser-based counter-countermeasure (CCM) subsystem carried by the aircraft, the CCM subsystem being configured and operative, during the deployment of the aircraft, to direct a simulated target designator laser signal to the laser detector of the countermeasure system to trigger one or more of the countermeasures and thereby reduce protective ability of the countermeasure system against subsequent laser-guided attack;

wherein the CCM subsystem includes (1) a camera and control electronics constructed and arranged to provide associated automatic target recognition (ATR) functionality to identify the countermeasure system as a target, and (2) a laser subsystem configured and operative to generate and direct the simulated target designator laser signal to the countermeasure system.

2. The air-based counter-countermeasure system of claim 1, wherein the CCM subsystem includes an onboard library containing prescribed target categories and specifications for types of laser receivers and emplacements thereof on target countermeasure systems, the onboard library being accessed as part of identifying the countermeasure system as a target.

3. The air-based counter-countermeasure system of claim 1, wherein the control electronics is configured to operate the CCM subsystem in phases including (1) a target search and acquisition phase to search for and acquire a prescribed target, (2) a target laser receiver recognition phase to locate the laser detector and an emplacement position thereof in the countermeasure system, (3) a positioning and aiming phase to aim a laser aperture at an aperture of the laser detector, and (4) a target engagement and laser effects stage to transmit the simulated target designator laser signal via the laser aperture and thereby trigger the one or more countermeasures.

4. The air-based counter-countermeasure system of claim 3, wherein the transmission of the simulated target designator laser signal in stage (4) is repeated until the one or more countermeasures are triggered, or as long as commanded by a higher-level controller, or as long as a battery powering the counter-countermeasure system provides operating power.

5. The air-based counter-countermeasure system of claim 1, wherein the simulated target designator laser signal has a signature being a unique combination of features including intensity, pulse width, laser frequency, and pulse repetition rate.

6. The air-based counter-countermeasure system of claim 1, wherein the aircraft is a multi-rotor aircraft having a plurality of electrical rotors providing lift and maneuvering.

7. The air-based counter-countermeasure system of claim 6, wherein the multi-rotor aircraft has a copter configuration having the rotors disposed at ends of respective arms extending from a body of the aircraft.

8. The air-based counter-countermeasure system of claim 7, wherein the body is a generally cylindrical body having a central compartment housing batteries and an end compartment housing the CCM subsystem as a payload.

9. A method of engaging a countermeasure system to reduce protective ability of the countermeasure system against subsequent laser-guided attack, the countermeasure system having (1) a laser detector to receive and identify an incident laser signal as a target designator signal and (2) one or more countermeasure subsystems operative in response to an output of the laser detector to deploy corresponding countermeasures against a laser target designator, the method comprising:

deploying an air-based counter-countermeasure (CCM) system to an area of the countermeasure system, the CCM system having an autonomous or semi-autonomous unmanned aircraft carrying a laser-based CCM subsystem; and operating the CCM subsystem during the deployment of the CCM system to direct a simulated target designator laser signal to the laser detector of the countermeasure system to trigger one or more of the countermeasures and thereby reduce the protective ability of the countermeasure system against the subsequent laser-guided attack:

wherein the CCM subsystem includes (1) a camera and control electronics constructed and arranged to provide associated automatic target recognition (ATR) functionality to identify the countermeasure system as a target, and (2) a laser subsystem configured and operative to generate and direct the simulated target designator laser signal to the countermeasure system.

10. The method of claim 9, wherein the CCM subsystem includes an onboard library containing prescribed target categories and specifications for types of laser receivers and emplacements thereof on target countermeasure systems, the onboard library being accessed as part of identifying the countermeasure system as a target.

11. The method of claim 9, performed in phases including (1) a target search and acquisition phase to search for and acquire a prescribed target, (2) a target laser receiver recognition phase to locate the laser detector and an emplacement position thereof in the countermeasure system, (3) a positioning and aiming phase to aim a laser aperture at an aperture of the laser detector, and (4) a target engagement and laser effects stage to transmit the simulated target designator laser signal via the laser aperture and thereby trigger the one or more countermeasures.

12. The method of claim 11, wherein the transmission of the simulated target designator laser signal in stage (4) is repeated until the one or more countermeasures are triggered, or as long as commanded by a higher-level controller, or as long as a battery powering the counter-countermeasure system provides operating power.

13. The method of claim 9, wherein the simulated target designator laser signal has a signature being a unique combination of features including intensity, pulse width, laser frequency, and pulse repetition rate.

14. The method of claim 9, wherein the aircraft is a multi-rotor aircraft having a plurality of electrical rotors providing lift and maneuvering.

15. The method of claim 14, wherein the multi-rotor aircraft has a copter configuration having the rotors disposed at ends of respective arms extending from a body of the aircraft.

16. The method of claim 15, wherein the body is a generally cylindrical body having a central compartment housing batteries and an end compartment housing the CCM subsystem as a payload.

17. An air-based counter-countermeasure device, comprising:

a housing constructed and arranged to couple with an autonomous or semi-autonomous unmanned aircraft capable of deployment to an area of a countermeasure system having (1) a laser detector to receive and identify an incident laser signal as a target designator signal and (2) one or more countermeasure subsystems operative in response to an output of the laser detector to deploy corresponding countermeasures against a laser target designator; and laser-based counter-countermeasure (CCM) componentry supported by housing, the CCM componentry being configured and operative, during the deployment of the aircraft, to direct a simulated target designator laser signal to the laser detector of the countermeasure system to trigger one or more of the countermeasures and thereby reduce protective ability of the countermeasure system against subsequent laser-guided attack:

wherein the CCM componentry includes (1) a camera and control electronics constructed and arranged to provide associated automatic target recognition (ATR) functionality to identify the countermeasure system as a target, and (2) a laser subsystem configured and operative to generate and direct the simulated target designator laser signal to the countermeasure system.

18. The air-based counter-countermeasure device of claim 17, wherein the CCM subsystem includes an onboard library containing prescribed target categories and specifications for types of laser receivers and emplacements thereof on target countermeasure systems, the onboard library being accessed as part of identifying the countermeasure system as a target.

19. The air-based counter-countermeasure device of claim 17, wherein the control electronics is configured to operate the CCM subsystem in phases including (1) a target search and acquisition phase to search for and acquire a prescribed target, (2) a target laser receiver recognition phase to locate the laser detector and an emplacement position thereof in the countermeasure system, (3) a positioning and aiming phase to aim a laser aperture at an aperture of the laser detector, and (4) a target engagement and laser effects stage to transmit the simulated target designator laser signal via the laser aperture and thereby trigger the one or more countermeasures.

20. The air-based counter-countermeasure device of claim 19, wherein the simulated target designator laser signal has a signature being a unique combination of features including intensity, pulse width, laser frequency, and pulse repetition rate.

* * * * *